US009614600B2

United States Patent
Nagata et al.

(10) Patent No.: US 9,614,600 B2
(45) Date of Patent: Apr. 4, 2017

(54) BASE STATION APPARATUS, USER TERMINAL, COMMUNICATION SYSTEM AND COMMUNICATION CONTROL METHOD

(71) Applicant: NTT DOCOMO, INC., Tokyo (JP)

(72) Inventors: Satoshi Nagata, Tokyo (JP); Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 14/417,802

(22) PCT Filed: Jun. 18, 2013

(86) PCT No.: PCT/JP2013/066696
§ 371 (c)(1),
(2) Date: Jan. 28, 2015

(87) PCT Pub. No.: WO2014/021010
PCT Pub. Date: Feb. 6, 2014

(65) Prior Publication Data
US 2015/0195019 A1 Jul. 9, 2015

(30) Foreign Application Priority Data
Jul. 31, 2012 (JP) ................................. 2012-170260

(51) Int. Cl.
*H04L 1/02* (2006.01)
*H04B 7/0456* (2017.01)
(Continued)

(52) U.S. Cl.
CPC ............ *H04B 7/0456* (2013.01); *H04B 1/38* (2013.01); *H04B 7/04* (2013.01); *H04B 7/0426* (2013.01);
(Continued)

(58) Field of Classification Search
CPC .......... H04B 7/0456; H04B 7/04; H04B 7/06; H04B 7/10; H04B 1/38; H04B 7/0426;
(Continued)

(56) References Cited

U.S. PATENT DOCUMENTS 7,436,757 B1 10/2008 Wilson et al.
8,023,990 B2 9/2011 Parkvall
(Continued)

FOREIGN PATENT DOCUMENTS

JP 2011-515943 A 5/2011
JP 2012-129761 A 7/2012
(Continued)

OTHER PUBLICATIONS

International Search Report for corresponding International Application No. PCT/JP2013/066696, mailed Oct. 1, 2013 (1 page).
(Continued)

*Primary Examiner* — Syed Haider
(74) *Attorney, Agent, or Firm* — Osha Liang LLP

(57) ABSTRACT

A base station apparatus, a user terminal, a communication system and a communication control method that can support the diversification of communication is provided. In a base station apparatus, downlink measurement object signals are pre-coded using precoding weights that are specific to a user terminal, and transmitted to the user terminal, and, in the user terminal, the downlink measurement object signals are demodulated using the precoding weights that are specific to the user terminal, and measurement processes are performed based on the demodulated downlink measurement object signals.

17 Claims, 5 Drawing Sheets

(51) Int. Cl.
*H04W 52/04* (2009.01)
*H04B 7/04* (2017.01)
*H04B 7/10* (2017.01)
*H04J 11/00* (2006.01)
*H04W 16/28* (2009.01)
*H04B 1/38* (2015.01)
*H04B 7/0426* (2017.01)
*H04B 7/0452* (2017.01)
*H04W 52/22* (2009.01)
*H04B 7/0491* (2017.01)
*H04B 7/0413* (2017.01)
*H04B 7/06* (2006.01)
*H04W 88/08* (2009.01)

(52) U.S. Cl.
CPC ......... *H04B 7/0452* (2013.01); *H04B 7/0491* (2013.01); *H04B 7/06* (2013.01); *H04B 7/10* (2013.01); *H04J 11/00* (2013.01); *H04W 16/28* (2013.01); *H04W 52/04* (2013.01); *H04W 52/22* (2013.01); *H04B 7/0413* (2013.01); *H04B 7/0617* (2013.01); *H04W 88/08* (2013.01)

(58) Field of Classification Search
CPC .. H04B 7/0452; H04B 7/0413; H04B 7/0617; H04B 7/0491; H04W 52/04; H04W 16/28; H04W 52/22; H04W 88/08; H04J 11/00
See application file for complete search history.

(56) References Cited

U.S. PATENT DOCUMENTS

| | | | | |
|---|---|---|---|---|
| 8,615,052 | B2* | 12/2013 | Gomadam | H04B 7/0452 375/260 |
| 2011/0064159 | A1* | 3/2011 | Ko | H04B 7/04 375/267 |
| 2012/0020230 | A1* | 1/2012 | Chen | H04L 1/0028 370/252 |
| 2012/0039298 | A1* | 2/2012 | Lee | H04L 1/0079 370/330 |
| 2012/0106501 | A1 | 5/2012 | Kishiyama et al. | |
| 2012/0188988 | A1* | 7/2012 | Chung | H04J 13/00 370/335 |
| 2013/0039284 | A1* | 2/2013 | Marinier et al. | 370/329 |
| 2013/0114498 | A1* | 5/2013 | Park | H04W 4/06 370/312 |
| 2013/0242902 | A1* | 9/2013 | Liu | H04W 24/10 370/329 |
| 2013/0279403 | A1* | 10/2013 | Takaoka et al. | 370/328 |
| 2014/0301346 | A1* | 10/2014 | Seo | H04L 5/0048 370/329 |
| 2015/0049625 | A1* | 2/2015 | Kim | H04L 1/0026 370/252 |

FOREIGN PATENT DOCUMENTS

JP 2012-105256 A 5/2013
WO WO 2011083774 A1 * 7/2011

OTHER PUBLICATIONS

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).
Office Action issued in corresponding Japanese Application No. 2012-170260, mailed Sep. 6, 2016 (4 pages).
Extended Search Report issued in corresponding European Application No. 13824941.2, mailed Jul. 20, 2016 (17 pages).
T. Akbudak et al.; "CoMP in Heterogeneous Networks: A Low-Complexity Linear Transceiver Design"; IEEE, pp. 5624-5629; Jun. 2012 (6 pages).

* cited by examiner

BASE STATION APPARATUS, USER TERMINAL, COMMUNICATION SYSTEM AND COMMUNICATION CONTROL METHOD

TECHNICAL FIELD

The present invention relates to a base station apparatus, a user terminal, a communication system and a communication control method in a next-generation mobile communication system.

BACKGROUND ART

In a UMTS (Universal Mobile Telecommunications System) network, long-term evolution (LTE) is under study for the purposes of further increasing high-speed data rates, providing low delay and so on (non-patent literature 1). In LTE, as multiple access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

In LTE, MIMO (Multi Input Multi Output), which achieves improved data rates (spectral efficiency) by transmitting and receiving data using a plurality of antennas, is defined. According to MIMO, a plurality of transmitting/receiving antennas are provided in the transmitter/receiver, so that different transmission information sequences are transmitted from different transmitting antennas on the transmitting side at the same time. Meanwhile, on the receiving side, taking advantage of the fact that fading variation is produced differently between the transmitting/receiving antennas, information sequences that have been transmitted at the same time are separated and detected.

As MIMO transmission schemes, single-user MIMO (SU-MIMO), in which transmission information sequences for the same user are transmitted at the same time from different transmitting antennas, and multi-user MIMO (MU-MIMO), in which transmission information sequences for different users are transmitted at the same time from different transmitting antennas have been proposed. In SU-MIMO and MU-MIMO, optimal PMIs (Precoding Matrix Indicators) corresponding to the amount of phase and amplitude control (precoding weights) to be set in the antennas are selected from codebook, and fed back to the transmitter as channel information (CSI: Channel State Information). On the transmitter side, each transmitting antenna is controlled based on the PMIs fed back from the receiver, and transmission information sequences are transmitted.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Also, successor systems of LTE (referred to as, for example, "LTE-advanced" or "LTE enhancement" (hereinafter referred to as "LTE-A")) are under study for the purpose of achieving further broadbandization and increased speed beyond LTE. In this LTE-A system, a study in progress to adopt beam forming to give vertical directivity to beams output from a base station apparatus, and MIMO to use this (3D MIMO/beam forming), in order to achieve even higher data rates (spectral efficiency). Also, a study is in progress to adopt beam forming to generate a large volume of beams from antenna elements that are designed on a reduced scale in a high frequency band, and MIMO to use this (massive-antenna MIMO/beam forming). Furthermore, a study is in progress to control downlink transmission power from base station apparatuses in a flexible manner (flexible DL power control).

In systems where such new communication schemes are adopted, user-specific (UE-specific) control becomes necessary. However, the configurations at present are not designed with user-specific control sufficiently, and therefore it is not possible to optimize the true performance of the systems.

The present invention has been made in view of the above, and it is therefore an object of the present invention to provide a base station apparatus, a user terminal, a communication system and a communication control method that can support the diversification of communication.

Solution to Problem

The communication system of the present invention has a base station apparatus which includes a precoding processing section configured to pre-code a downlink measurement object signal using a precoding weight that is specific to a user terminal, and a transmission section configured to transmit the downlink measurement object signal having been pre-coded in the precoding processing section, to the user terminal, and the user terminal which includes a receiving section configured to receive the downlink measurement object signal having been pre-coded using the precoding weight, a demodulation section configured to demodulate the downlink to measurement object signal using the precoding weight, and a measurement section configured to perform a measurement process based on the demodulated downlink measurement object signal.

Technical Advantage of the Invention

According to the present invention, it is possible to provide a base station apparatus, a user terminal, a communication system and a communication control method that can support the diversification of communication.

DESCRIPTION OF EMBODIMENTS

Figure 1B:
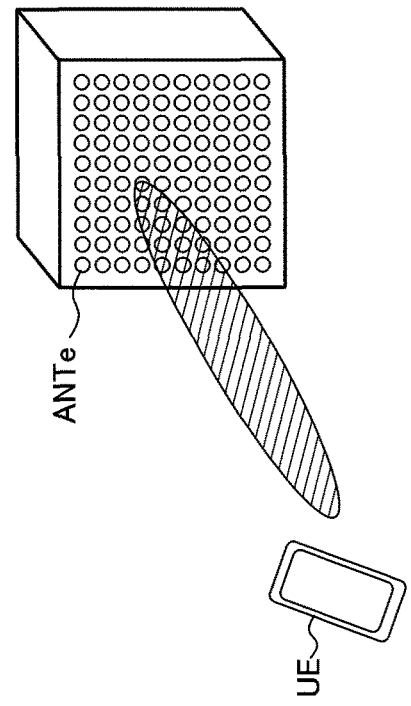
FIG. 1 provides diagrams to explain communication schemes that may be applied to an LTE-A system.

Now, an embodiment of the present invention will be described below in detail with reference to the accompanying drawings. First, communication schemes that may be applied to an LTE-A system, which adopts the communication system of the present invention, will be described below. FIG. 1 and FIG. 2 provide diagrams to explain communication schemes that may be applied to an LTE-A system.

Figure 1A:
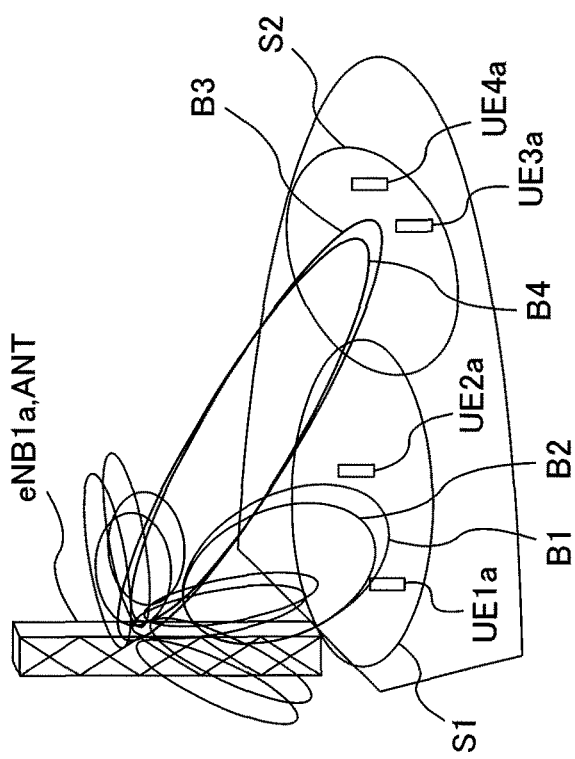
Figure 2:
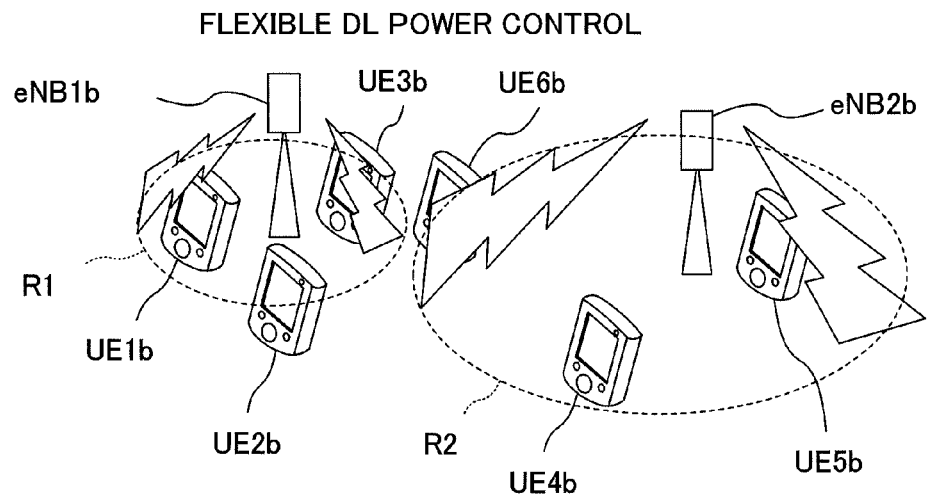
FIG. 2 is a diagram to explain communication schemes that may be applied to an LTE-A system.

In FIG. 1A, beam forming to give vertical directivity to beams transmitted from a base station apparatus, and MIMO to use this (these may be referred to as, for example, "3D MIMO/beam forming" and so on) are shown. In FIG. 1B, beam forming to generate a large volume of beams from antenna elements that are designed on a reduced scale in a high frequency band, and MIMO to use this (these may be referred to as, for example, "massive-antenna MIMO/beam forming" and so on) are shown. In FIG. 2, a communication scheme to control transmission power from base station apparatuses in a flexible manner (this may be referred to as, for example, "flexible downlink power control") is shown.

As shown in FIG. 1A, in a communication system where 3D MIMO/beam forming are adopted, horizontal beams that are the same as heretofore are output, and, furthermore, beams having vertical directivity are output to user terminals UE $1a$, UE $2a$, UE $3a$ and UE $4a$, from an antenna ANT of a base station apparatus eNB $1a$. In this way, by outputting beams with varying tilt angles from the antenna ANT of the base station apparatus eNB $1a$, space is divided into a plurality of sectors (in FIG. 1A, into sectors S1 and S2). Note that the sectors S1 and S2 may be referred to as the "inner cell" and the "outer cell," respectively. Here, the tilt angle refers to the angle of beams with respect to the horizontal direction (the ground, for example).

For example, in FIG. 1A, two beams B1 and B2 with a large tilt angle are output from the antenna ANT to the sector S1 (inner cell) that is near the base station apparatus eNB $1a$. Also, two beams B3 and B4 with a small tilt angle are output from the antenna ANT to the sector S2 (outer cell) that is far from the base station apparatus eNB $1a$. In 3D MIMO/beam forming, beams that have directivity toward the sectors S1 and S2 are generated by changing the precoding weights by which the antenna elements constituting the antenna ANT are multiplied. The base station apparatus eNB $1a$ performs downlink radio communication with the user terminals UE $1a$ and UE $2a$ in the sector S1, and performs downlink radio communication with the user terminals UE $3a$ and UE $4a$ in the sector S2. Note that a plurality of beams may be output from one antenna ANT as shown in FIG. 1A, or may be output from a plurality of antennas (not shown). FIG. 1A shows, as an example, a case where an array antenna including a plurality of antennas elements that are aligned vertically is used as the antenna ANT.

As shown in FIG. 1B, in a communication system where massive-antenna MIMO/beam forming are adopted, a large volume of beams are generated from antenna elements ANTe that are designed on a reduced scale in a high frequency band. In this massive-antenna MIMO/beam forming, beams to match the number of antenna elements can be generated at a maximum, by changing the transmission weights to apply by multiplication, on a per antenna element basis. Furthermore, in massive-antenna MIMO/beam forming, the decrease of antenna gain in each antenna element is compensated for by a large a volume of beam forming gain.

As shown in FIG. 2, in a communication system where flexible downlink power control is applied, the transmission power of the base station apparatuses eNB $1b$ and eNB $2b$ is controlled dynamically depending on the communication environment. For example, the transmission power of the base station apparatus eNB $1b$ is controlled to be lower than the transmission power of the base station apparatus eNB $2b$. By this means, the transmission range R1 of the base station apparatus eNB $1b$ is configured to be narrower than the transmission range R2 of the base station apparatus eNB $2b$. The base station apparatus eNB $1b$ performs downlink radio communication with user terminals UE $1b$, UE $2b$ and UE $3b$ in the transmission range R1, and the base station apparatus eNB $2b$ performs downlink radio communication with user terminals UE $4b$, UE $5b$ and UE $6b$ in the transmission range R2. Note that only one of or both of 3D MIMO/beam forming or massive-antenna MIMO/beam forming (hereinafter referred to as "3D MIMO/beam forming and so on"), and flexible downlink power control, may be employed.

In a communication system where these communication schemes are employed, a transmission mode (TM 9) to use DM-RSs (DeModulation-Reference Signals), which are user-specific reference signals, is effective. This TM 9 is a transmission mode that is newly added in LTE-A (Rel. 10), and supports MU-MIMO up to rank 8. Also, in TM 9, demodulation is carried out using DM-RSs. Note that DCI format 2C is defined to support TM 9.

In TM 9, downlink channel quality information (CQI: Channel Quality Indicator) is measured based on CSI-RSs (Channel State Information-Reference Signals). Now, even when 3D MIMO/beam forming and so on and flexible downlink power control are employed, precoding and power control that are suitable for user terminals UE are not applied to CSI-RSs. Consequently, when 3D MIMO/beam forming and so on and flexible downlink power control are employed, it is difficult to adequately evaluate downlink transmission path states corresponding to each user terminal UE based solely on CQIs that are measured based on CSI-RSs.

Figure 3:
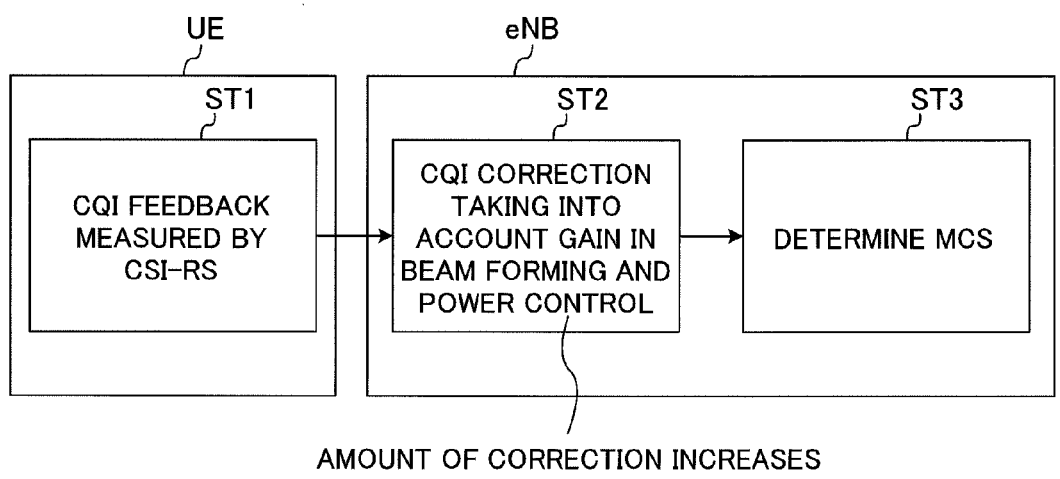
FIG. 3 is a diagram to explain the steps of determining MCS (modulation scheme and coding rate) based on CQIs.

FIG. 3 is a diagram to explain the steps of determining MCS (modulation scheme and coding rate) based on CQIs. As noted earlier, when beam forming and power control are applied, it is not possible to adequately evaluate transmission path states based solely on CQIs that are measured based on CSI-RSs. Consequently, when a CQI is fed back from a user terminal UE (step ST 1), a base station apparatus eNB corrects the CQI taking into account the impact of beam forming and power control (step ST 2). Then, the base station apparatus eNB determines the MCS based on the corrected CQI (step ST 3). However, since the correction that is applied in the base station apparatus eNB may involve errors, if the amount of correction increases by actively conducting beam forming or power control, this may result in a greater deviation from an adequate MCS and deteriorated communication characteristics.

Similar to CSI-RSs, in TM 9, the synchronization signal and the broadcast signal constituting the measurement object signals in user terminals UE are not applied precoding or power control that are adequate for the user terminals UE either. Meanwhile, data signals that are transmitted on the downlink are applied precoding and power control taking into account the transmission path states with respect to the user terminals UE. Consequently, similar to the case with CSI-RSs, if the amount of correction increases by actively conducting beam forming or power control, this may result in a greater deviation between the measurement results that should really be measured and the measurement results derived from the measurement object signals received, and in deteriorated communication characteristics.

Problems like these arise from the fact that it is not possible to adequately evaluate the states of transmission paths when beam forming and power control are applied, based on downlink measurement object signals to which precoding and power control are not applied taking into account the transmission path states with respect to user terminals UE. The present inventors have focused on this technical problem, and, upon finding out that, by correcting downlink measurement object signals, to which precoding and power control are not applied taking into account the transmission path states with respect to user terminals UE, in a base station apparatus eNB or in the user terminals UE, it is possible to reduce the deterioration of communication characteristics due to differences in the evaluation of transmission path states between the base station apparatus eNB and the user terminals UE, and made the present invention.

That is, a gist of the present invention is that downlink measurement object signals are pre-coded using precoding weights (hereinafter referred to simply as "weights") that are specific to a user terminal and transmitted to the user terminal, and, in the user terminals, the downlink measurement object signals are demodulated using the above weights, and measurement processes are performed based on the demodulated downlink measurement object signals.

In the following description, signals that are transmitted from a base station apparatus eNB and that need to be subjected to some measurement process in user terminals UE will be referred to as "downlink measurement object signals" or simply as "measurement object signals." The downlink measurement object signals herein may be, for example, a synchronization signal, a broadcast signal, a reference signal and so on, but are by no means limited to these. For example, the downlink measurement object signals may as well be a control signal (PDCCH: Physical Downlink Control CHannel, ePDCCH: enhanced PDCCH, and so on), a paging signal, and so on. An ePDCCH refers to a predetermined frequency band in the PDSCH (Physical Downlink Shared CHannel) region (data signal region) that is used as a PDCCH region (control signal region). An ePDCCH that is allocated to the PDSCH region is demodulated using DM-RSs (Demodulation-Reference Signals). Note that an ePDCCH may be referred to as an "FDM-type PDCCH" or may be referred to as a "UE-PDCCH."

For example, downlink measurement object signals include signals having the following characteristics. Note that downlink measurement object signals include one of the signals shown below, or signals combining some of these signals.

(a) Synchronization signals (PSS: Primary Synchronization Signal, SSS: Secondary Synchronization Signal) defined in LTE (Rel-8) are included.

(b) Signals that use the same sequences as the synchronization signals defined in LTE (Rel-8) and that are multiplexed in different locations along the time/frequency direction are included. For example, signals multiplexed in slot different from slot in which the PSS and the SSS are multiplex apply.

(c) DISCOVERY SIGNALS that are newly defined in order to select small cells are included. Here, the small cells refer to, for example, many cells that are placed in a macro cell area in a heterogeneous network configuration. Also, the DISCOVERY SIGNALS refer to the reference signals that are transmitted from small cells so as to allow user terminals UE to discover small cells that are adequate for data channel (and/or control channel) transmission. For example, signals with characteristics such as having a long transmission cycle or having a large amount of radio resources per transmission unit, compared to the synchronization signals (PSS and SSS) defined in LTE (Rel-8), may apply.

(d) Conventional reference signals defined in LTE-A (Rel-10) (CSI-RS, CRS (Cell-specific Reference Signal), DM-RS, PRS (Positioning Reference Signal), SRS (Sounding Reference Signal)) are included. Note that only part of the conventional reference signals (for example, a signal that transmits the CRS of one port in a 5-msec cycle) may be included.

(e) Broadcast signals defined in LTE (Rel-8) are included. The broadcast signals include, for example, master information blocks (MIBs) and system information blocks (SIBs).

The first example of the present invention provides a communication system, in which, in a base station apparatus eNB, downlink measurement object signals are pre-coded using weights that are specific to a user terminal UE, and transmitted to the user terminal UE, and, in the user terminal UE, the downlink measurement object signals are demodulated using the above weights, and measurement processes are performed based on the demodulated downlink measurement object signals.

With the first example, in a base station apparatus eNB, downlink measurement object signals are pre-coded using weights that are specific to a user terminal UE and transmitted to the user terminal UE. In the user terminal UE, demodulation is carried out using the weights specific to the user terminal, and measurement processes are performed based on the demodulated downlink measurement object signals. Consequently, it is possible to use weights that are specific to a user terminal UE in the precoding and demodulation of downlink measurement object signals, so that it is possible to correct even downlink measurement object signals that are not pre-coded taking into account the transmission path state with respect to the user terminal UE. By this means, even in a communication environment where new communication schemes such as 3D MIMO/beam forming and so on are employed, it is possible to reduce the deterioration of communication characteristics due to differences in the evaluation of transmission path states with respect to user terminals UE. As a result of this, it is possible to optimize the true performance of communication systems where these new communication schemes are employed.

According to the first example, a base station apparatus eNB can select the weights that are used to pre-code the downlink shared data channel signal (for example, the PDSCH) for a user terminal UE (hereinafter referred to as "weights for a downlink shared data channel signal"), as weights that are specific to the user terminal UE. In this case, the downlink measurement object signals are pre-coded using the weights for the downlink shared data channel signal, so that the precoding is executed taking into account the transmission path state with respect to the user terminal UE. By this means, it is possible to transmit downlink measurement object signals that reflect the downlink transmission path state associated with the user terminal UE. As a result of this, even in a communication environment where new communication schemes such as 3D MIMO/beam forming and so on are employed, it is possible to prevent differences in the evaluation of transmission path states with respect to user terminals UE, and achieve improved communication characteristics.

Now, a specific example of a case where weights for a downlink shared data channel signal are selected as weights that are specific to a user terminal UE will be described. A communication system will be described here in which 3D MIMO/beam forming and massive-antenna MIMO/beam forming described above are employed. Also, a case will be described here where CSI-RSs are the downlink measurement object signals.

When 3D MIMO/beam forming are employed, for example, beams having directivity toward the inner cell and the outer cell are generated by changing the weights by which the antenna elements constituting the antenna of the base station apparatus eNB are multiplied. When the weights for a downlink shared data channel signal are selected, for the CSI-RS for a user terminal UE that is located in the inner cell, the weights to multiply the downlink shared data channel signal for that user terminal UE (weights for the inner cell) by are selected. On the other hand, for the CSI-RS for a user terminal UE that is located in the outer cell, the weights to multiply the downlink shared data channel signal for that user terminal UE (weights for the outer cell) by are selected. By this means, it is possible to transmit different CSI-RSs to user terminals UE in the time domain, the frequency domain and the space domain.

Also, the unit of multiplication by weights may assume any scale in the time domain, the frequency domain and the space domain. For example, in the frequency domain, weights may be multiplied per resource element, per multiple resource elements, per resource block, or per multiple resource blocks. Also, in the time domain, weights may be multiplied per symbol, per multiple symbols, per slot (or multiple slots), per subframe (or multiple subframes), or per radio frame (or multiple radio frames).

When massive-antenna MIMO/beam forming are employed, beams to match the number of antenna elements are generated at a maximum, by, for example, changing the weights to apply by multiplication, on a per antenna element basis. When selecting the weights for a downlink shared data channel signal, the base station apparatus eNB selects associated weights on a per antenna element basis, for the CSI-RSs transmitted to each user terminal UE. By this means, it is possible to transmit different CSI-RSs to user terminals UE in the time domain, the frequency domain and the space domain.

Also, the first example may be designed so that the base station apparatus eNB applies transmission power control to downlink measurement object signals using a power control value that is specific to a user terminal UE, and transmits the downlink measurement object signals to the user terminal UE, and in the user terminal UE, measurement processes are performed based on the downlink measurement object signals having been adjusted based on the above power control values.

In this way, when applying transmission power control to downlink measurement object signals, the base station apparatus eNB applies transmission power control to the downlink measurement object signals using power control values that are specific to a user terminal UE, and transmit the resulting signals to the user terminal UE. In the user terminal UE, measurement processes for the downlink measurement object signals are executed based on the power control values specific to the user terminal UE. Consequently, it is possible to perform the measurement processes for the downlink measurement object signals based on the same power control values as the power control values used in the transmission power control in the base station apparatus eNB, so that it is possible to correct even downlink measurement object signals, to which transmission power control is not applied taking into account the transmission path state with respect to the user terminal UE. By this means, even in a communication environment where new communication schemes such as 3D MIMO/beam forming and so on are employed, it is possible to reduce the deterioration of communication characteristics due to differences in the evaluation of transmission path states with respect to user terminals UE. As a result of this, it is possible to optimize the true performance of communication systems employing these new communication schemes.

Note that the transmission power control for downlink measurement object signals may be executed in parallel with precoding using user terminal UE-specific weights. In this case, it is possible to correct the downlink measurement object signals from both perspectives of user terminal UE-specific weights and power control values. By this means, even in a communication environment where new communication schemes such as 3D MIMO/beam forming and so on are employed, it is possible to reduce the differences in the evaluation of transmission path states with respect to user terminals UE, and, furthermore, achieve improved communication characteristics.

Also, it is equally possible to execute transmission power control for downlink measurement object signals independently of precoding using user terminal UE-specific weights. In this case, it is possible to execute the transmission power control of the downlink measurement object signals and the precoding of the downlink measurement object signals on a switched basis. By this means, it is possible to select one of transmission power control and precoding for downlink measurement object signals, depending on the communication environment with respect to user terminals UE, and correct the downlink measurement object signals in a flexible manner.

Furthermore, when applying precoding using weights that are specific to a user terminal UE and/or transmission power control using power control values that are specific to the user terminal UE to downlink measurement object signals, the base station apparatus eNB may send a report to the effect that precoding and/or transmission power control is going to be executed, to the user terminal UE. For example, this report may be sent using a higher layer signaling signal (for example, RRC signaling). Also, a broadcast signal or a downlink control channel signal (for example, the ePDCCH) may be used as well. By sending a report to the effect that precoding and/or transmission power control is going to be executed, in this way, it is possible to trigger the processes required in user terminals UE.

Furthermore, in addition to reporting that precoding and/or transmission power control is going to be executed, the base station apparatus eNB may also report information related to weights and/or power control values. When reporting information related to weights and/or power control values additionally in this way, it is possible to share, reliably, information that is required to demodulate and/or adjust the measurement object signals, between the base station apparatus eNB and the user terminals UE having received the report.

Furthermore, the base station apparatus eNB may switch between executing and not executing precoding using user terminal UE-specific weights and/or transmission power control using user terminal UE-specific power control values, switch the weights or power control values to use in precoding or transmission power control, and switch the content to report to user terminals UE in the time domain, the frequency domain and the space domain. For example, when switching the weights to use in the above precoding, it is possible to switch the weights in the time domain, the frequency domain or the space domain.

Meanwhile, in accordance with the first example, a user terminal UE may demodulate downlink measurement target signals using weights that are specific to the user terminal UE (that is, the terminal itself) and perform measurement processes based on these downlink measurement target signals. Furthermore, the user terminal UE can transmit (feed back) the measurement results to the base station apparatus eNB depending on the types of the downlink measurement target signals.

For example, the user terminal UE can acquire weights that are specific to the user terminal UE based on specific signals (for example, DM-RSs, the downlink shared channel data signal, and so on) that are pre-coded using the user terminal UE-specific weights. Note that the user terminal UE may be designed to acquire weights that are specific to the user terminal UE only when receiving a report from the base station apparatus eNB to the effect that precoding is executed using the user terminal UE-specific weights. In this case, the processes in the user terminal UE can be simplified.

Furthermore, the user terminal UE may acquire weights that are specific to the user terminal UE based on specific signals (for example, DM-RSs and so on) by assuming that the downlink measurement object signals are pre-coded using the user terminal UE-specific weights, when predetermined conditions are met. Note that the predetermined conditions may be, for example, that the differences between the parameters of the downlink measurement object signals (for example, the phase, amplitude and received power) and the parameters of the above specific signals fall below predetermined thresholds. In this case, the weights that are specific to the user terminal UE are acquired automatically upon fulfillment of the predetermined conditions, so that it is possible to further simplify the processes in the user terminals UE.

Note that the same holds in cases where transmission power control is executed based on user terminal UE-specific power control values. For example, a user terminal UE can acquire power control values that are specific to the user terminal UE based on specific signals (for example, DM-RSs, the downlink shared channel data signal, and so on). Note that the user terminal UE may be designed to acquire power control values that are specific to the user terminal UE only when receiving a report from the base station apparatus eNB to the effect that transmission power control is executed using the user terminal UE-specific power control values. Also, the same holds with the control for automatically acquiring user terminal UE-specific power control values upon fulfillment of predetermined conditions.

Also, the user terminal UE can receive a report of information related to user terminal UE-specific weights and/or power control values from the base station apparatus eNB. In this case, it is not necessary to acquire user terminal UE-specific weights/power control values based on specific signals (for example, DM-RSs, the downlink shared channel data signal and so on). Consequently, it is possible to simplify the processes in the user terminal UE.

Now, the measurement processes for downlink measurement object signals in user terminals UE will be described. In the measurement processes executed in user terminals UE, the process to be required varies depending the types of the downlink measurement object signals. In the following description, the content of the measurement processes in an LTE-A system will be described with reference to the steps of communication between user terminals UE and a base station apparatus eNB. A case will be described here where the downlink measurement object signals are comprised of a synchronization signal, a broadcast signal and a reference signal.

In the LTE-A system, when a user terminal UE starts data channel/control channel transmission/reception with a base station apparatus eNB, the following steps take place.

(1) Establishing Synchronization

When the user terminal UE receives a synchronization signal from the base station apparatus eNB, the user terminal UE establishes synchronization with the base station apparatus eNB. With the first example, it is possible to pre-code the synchronization signal using weights that are specific to the user terminal UE. In the user terminal UE, this synchronization signal is demodulated using weights that are reported through higher layer signaling and so on, and the measurement process is performed based on the demodulated synchronization signal, thereby establishing synchronization with the base station apparatus eNB. That is, the measurement process for the synchronization signal equals the process of detecting the synchronization signal prior to establishing synchronization.

(2) Measurements

When the user terminal UE receives a broadcast signal from the base station apparatus eNB, the user terminal UE measures the received signal power from the base station apparatus eNB (MEASUREMENT). With the first example, similar to the case with the synchronization signal, the broadcast signal can be pre-coded using weights that are specific to the user terminal selected in the base station apparatus eNB. In the user terminal UE, this broadcast signal is demodulated using weights that are reported through higher layer signaling and so on, and the received signal power from the base station apparatus eNB is measured based on the demodulated broadcast signal. That is, the measurement process for the broadcast signal equals the process of measuring the received signal power from the base station apparatus eNB based on the broadcast signal. Note that the user terminal UE measure received signal power with respect to a plurality of cells, and transmits (feeds back) the measurement results to the base station apparatus eNB as MEASUREMENT reports.

(3) CSI Feedback

When the user terminal UE receives a reference signal (for example, a CSI-RS) from the base station apparatus eNB, the user terminal UE measures channel quality based on this reference signal. With the first example, similar to the cases with the synchronization signal and the broadcast signal, it is possible to pre-code the reference signal by means of user terminal UE-specific weights that are selected in the base station apparatus eNB. The user terminal UE demodulate this reference signal using weights that are reported through higher layer signaling and so on, and measures channel quality based on the demodulated reference signal. In this case, after having determined a CQI, the user terminal UE selects a PMI and an RI based on this CQI. Then, the user terminal UE feeds back these CQI, PMI and RI to the base station apparatus eNB as CSI information.

In this way, with the first example of the present invention, it is possible to pre-code and demodulate downlink measurement object signals using user terminal UE-specific weights in each phase in the steps of communication, so that it is possible to correct even downlink measurement object signals that are not pre-coded taking into account the transmission path states with respect to user terminals UE. By this means, even in a communication environment where new communication schemes such as 3D MIMO/beam forming and so on are employed, it is possible to reduce the deterioration of communication characteristics due to differences in the evaluation of transmission path states with respect to user terminals UE. As a result of this, it is possible to optimize the true performance of communication systems employing these new communication schemes.

A second example of the present invention provides a communication system in which measurement processes are performed based on downlink measurement object signals received from a base station apparatus eNB, and in which the measurement results of the measurement processes are corrected based on specific signals that are pre-coded using user terminal UE-specific weights. Note that, with the second example, too, the downlink measurement object signals include, for example, a synchronization signal, a broadcast signal and a reference signal, but are by no means limited to these.

With the above-described first example, in a base station apparatus eNB, downlink measurement object signals are pre-coded using weights that are specific to a user terminal UE, and transmitted to the user terminal UE. By contrast with this, with the second example, downlink measurement object signals are not pre-coded using user terminal UE-specific weights. With the second example, in a user terminal UE, measurement results that are measured from downlink measurement object signals are corrected using the user terminal UE-specific weights by which specific signals are multiplied. Note that the specific signals that are pre-coded using user terminal UE-specific weights may include, for example, DM-RSs, the downlink shared data channel signal and so on.

Here, a specific example of a communication system in which the second example is employed will be described. A case will be described here where CSI-RSs are the downlink measurement object signals and DM-RSs are the specific signals to be pre-coded using user terminal UE-specific weights.

With the second example, CSI-RSs, which are the downlink measurement object signals, are not pre-coded using user terminal UE-specific weights. A user terminal UE performs the measurement process (channel quality measurement process) for these CSI-RSs. The to user terminal UE corrects the measurement result (CQIs) using the user terminal UE-specific weights by which DM-RSs are multiplied. Then, the user terminal UE reports the corrected CQIs to the base station apparatus eNB. The base station apparatus eNB performs processes such as MCS selection based on these corrected CQIs.

In this way, with the second example, a user terminal UE performs measurement processes based on downlink measurement object signals, and corrects the measurement results using the user terminal UE-specific weights by which specific signals are multiplied. By this means, it is possible to correct even downlink measurement object signals that are not pre-coded taking into account the transmission path state with respect to the user terminal UE. Consequently, even in a communication environment where new communication schemes such as 3D MIMO/beam forming and so on are employed, it is possible to reduce the deterioration of communication characteristics due to differences in the evaluation of transmission path states with respect to user terminals UE. As a result of this, it is possible to optimize the true performance of communication systems employing these new communication schemes.

Note that, although the second example has been described using user terminal UE-specific weights by which specific signals are multiplied, the second example is equally applicable to user terminal UE-specific power control values that are adjusted by specific signals as well. A user terminal UE corrects downlink measurement object signals that arrive from the base station apparatus eNB using user terminal UE-specific power control values that are adjusted by specific signals. By this means, it is possible to correct even downlink measurement object signals to which transmission power control is not applied taking into account the transmission path state with respect to the user terminal UE. By this means, even in a communication environment where new communication schemes such as 3D MIMO/beam forming and so on are employed, it is possible to reduce the deterioration of communication characteristics due to differences in the evaluation of transmission path states with respect to user terminals UE. As a result of this, it is possible to optimize the true performance of communication systems employing these new communication schemes.

A third example of the present invention provides a communication system, in which measurement results that are based on downlink measurement object signals are transmitted from a user terminal UE to a base station apparatus eNB, and in which weights that are specific to the user terminal UE and that are extracted from specific signals pre-coded using the user terminal UE-specific weights are transmitted to the base station apparatus eNB. Note that, with the third example, too, the downlink measurement object signals include, for example, a synchronization signal, a broadcast signal and a reference signal, but are by no means limited to these.

With the above-described second example, measurement results that are measured from downlink measurement object signals are corrected using the user terminal UE-specific weights by which specific signals are multiplied. The third example is different from the second example in transmitting user terminal UE-specific weights to a base station apparatus eNB, instead of applying user terminal UE-specific weights to measurement results. Note that the specific signals which are multiplied by user terminal UE-specific weights include, for example, DM-RSs, the downlink shared data channel signal and so on.

Now, a specific example of a communication system where the third example is applied will be described. A case will be described here where CSI-RSs are the downlink measurement object signals and DM-RSs are the specific signals to be pre-coded using user terminal UE-specific weights.

With the third example, CSI-RSs, which are the downlink measurement object signals, are not pre-coded using user terminal UE-specific weights. A user terminal UE performs the measurement process (channel quality measurement process) for these CSI-RSs. Meanwhile, the user terminal UE acquires the user terminal UE-specific weights by which DM-RSs are multiplied. The measurement result (CQIs) from the measurement process and the user terminal UE-specific weights are fed back to the base station apparatus eNB. The base station apparatus eNB corrects the measurement results (CQIs) based on these measurement results (CQIs) and user terminal UE-specific weights, and performs processes such as MCS selection.

In this way, with the third example, a user terminal UE performs measurement processes based on downlink measurement object signals, and acquires the user terminal UE-specific weights by which specific signals are multiplied. Then, the user terminal UE transmits the measurement results (CQIs) of the measurement processes and the user terminal UE-specific weights to a base station apparatus eNB. The base station apparatus eNB corrects these measurement result (CQIs) based on these measurement result (CQIs) and user terminal UE-specific weights. By this means, it is possible to reduce the impact that arises from downlink measurement object signals that are pre-coded taking into account the transmission path state with respect to the user terminal UE. By this means, even in a communication environment where new communication schemes such as 3D MIMO/beam forming and so on are employed, it is possible to reduce the deterioration of communication characteristics due to differences in the evaluation of transmission path states with respect to user terminals UE. As a result of this, it is possible to optimize the true performance of communication systems employing these new communication schemes.

Note that, although the third example has been described using user terminal UE-specific weights by which specific signals are multiplied, the third example is equally applicable to user terminal UE-specific power control values that are adjusted by specific signals as well. A user terminal UE acquires user terminal UE-specific power control values that are adjusted by specific signals that arrive from a base station apparatus eNB. Then, the user terminal UE transmits the acquired power control values and measurement results that are based on downlink measurement object signals, to the base station apparatus eNB. The base station apparatus eNB corrects the measurement results based on these measurement result (CQIs) and user terminal UE-specific weights. By this means, it is possible to correct even downlink measurement object signals, to which transmission power control is not applied taking into account the transmission path state with respect to the user terminal UE. Consequently, even in a communication environment where new communication schemes such as 3D MIMO/beam forming and so on are employed, it is possible to reduce the deterioration of communication characteristics due to differences in the evaluation of transmission path states with respect to user terminals UE. As a result of this, it is possible to optimize the true performance of communication systems employing these new communication schemes.

Although the first to third examples of the present invention have been described separately in the above description, these may be configured in combinations. For example, it is possible to switch between the control according to the first example and the controls according to the second example and the third example, in a base station apparatus eNB, depending on changes in the communication environment. In this case, changes in the communication environment may relate to, for example, the number of user terminals UE to be the object of communication, the communication capabilities of user terminals UE to be the object of communication, and so on. In this way, by switching between the control according to the first example and the controls according to the second example and the third example, it is possible to switch the transmission mode of downlink measurement object signals adequately. By this means, it is possible to adequately correct downlink measurement object signals, while flexibly coping with changes in the communication environment.

Figure 4:
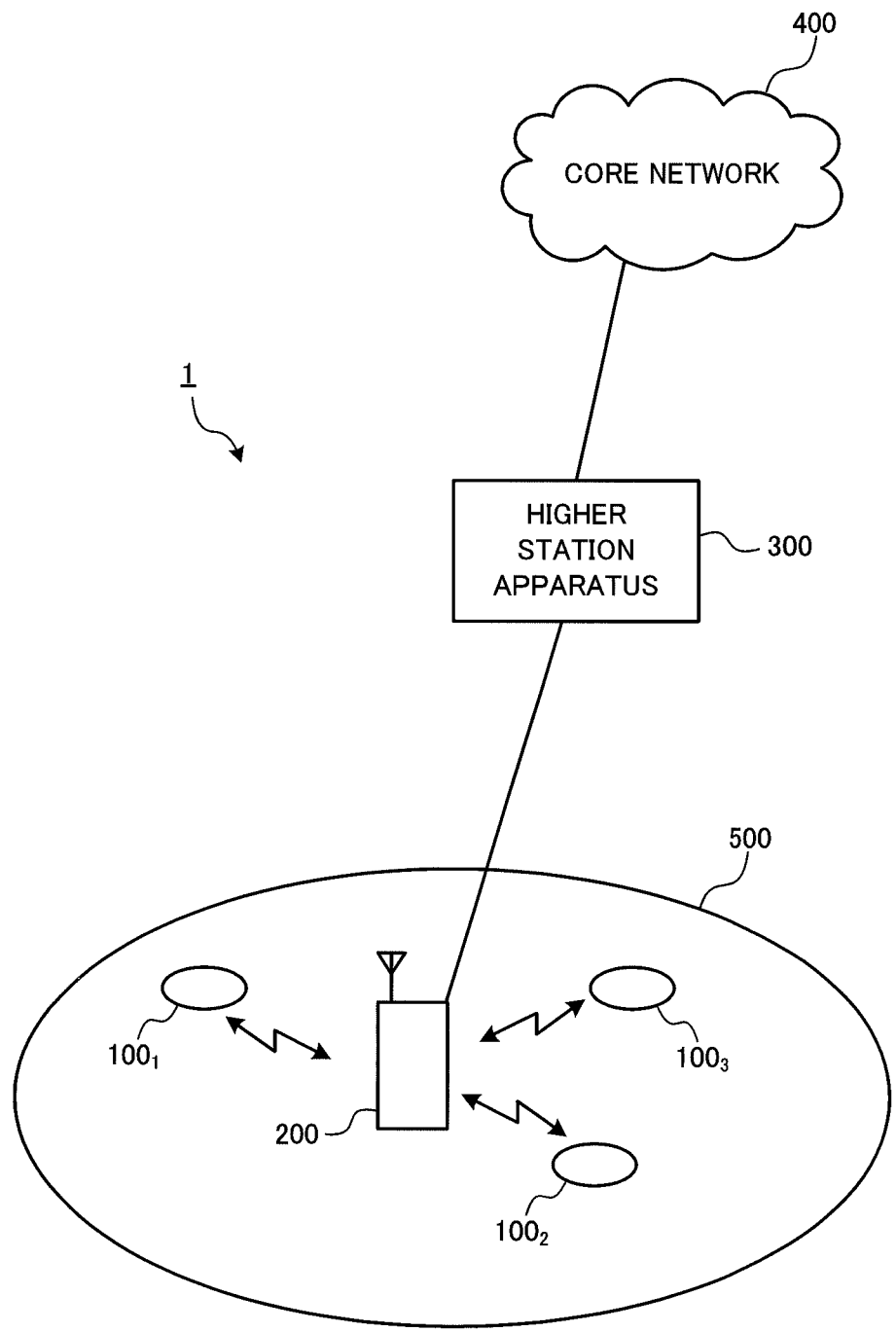
FIG. 4 is a diagram to explain a system configuration of a radio communication system according to the present embodiment.

Next, a communication system 1, which has mobile station apparatuses 100 (hereinafter referred to as "mobile stations 100") to constitute user terminals UE and a base station apparatus 200 (hereinafter referred to as "base station 200") to constitute a base station apparatus eNodeB according to the present embodiment, will be described with reference to FIG. 4. FIG. 4 is a diagram to explain a configuration of the communication system 1 having mobile stations 100 and a base station 200 according to the present embodiment. Note that the communication system 1 shown in FIG. 4 is a system to accommodate, for example, the LTE system or SUPER 3G. Also, this mobile communication system 1 may be referred to as "IMT-Advanced" or may be referred to as "4G."

As shown in FIG. 4, the communication system 1 is formed to include a base station 200 and a plurality of mobile stations 100 ($100_1$, $100_2$, $100_3$, ... $100_n$, where n is an integer to satisfy n>0) that communicate with this base station 200. The base station 200 is connected with a higher station apparatus 300, and this higher station apparatus 300 is connected with a core network 400. The mobile stations 100 communicate with the base station 200 in a cell 500. Note that the higher station apparatus 300 may be, for example, an access gateway apparatus, a radio network controller (RNC), a mobility management entity (MME) and so on, but is by no means limited to these.

The mobile stations ($100_1$, $100_2$, $100_3$, ... $100_n$) have the same configurations, functions and states, and therefore will be hereinafter described as "mobile station 100," unless specified otherwise. Also, although, for ease of explanation, the mobile station 100 will be described to perform radio communication with the base station 200, more generally, user equipment UE, which may include both mobile terminal apparatuses and fixed terminal apparatuses, may be used as well.

In the communication system 1, as radio access schemes, OFDMA (Orthogonal Frequency Division Multiple Access) is applied to the downlink, and SC-FDMA (Single-Carrier-Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Now, communication channels in the LTE/LTE-A system will be described. On the downlink, the PDSCH, which is used by each mobile station 10 on a shared basis, and downlink L1/L2 control channels (the PDCCH, the PCFICH (Physical Control Format Indicator CHannel), and the PHICH (Physical Hybrid-ARQ Indicator CHannel)) are used. User data—that is, normal data signals—is transmitted by means of this PDSCH. Transmission data is included in this user data. Note that the component carriers (CCs) and scheduling information that are allocated to the mobile station 100 in the radio base station 200 are reported to the mobile station 100 by means of the L1/L2 control channels.

On the uplink, the PUSCH (Physical Uplink Shared CHannel), which is used by each mobile station 100 on a shared basis, and the PUCCH (Physical Uplink Control CHannel), which is an uplink control channel, are used. User data is transmitted by means of this PUSCH. Also, downlink radio quality information (CQI) is transmitted by the PUCCH.

Figure 5:
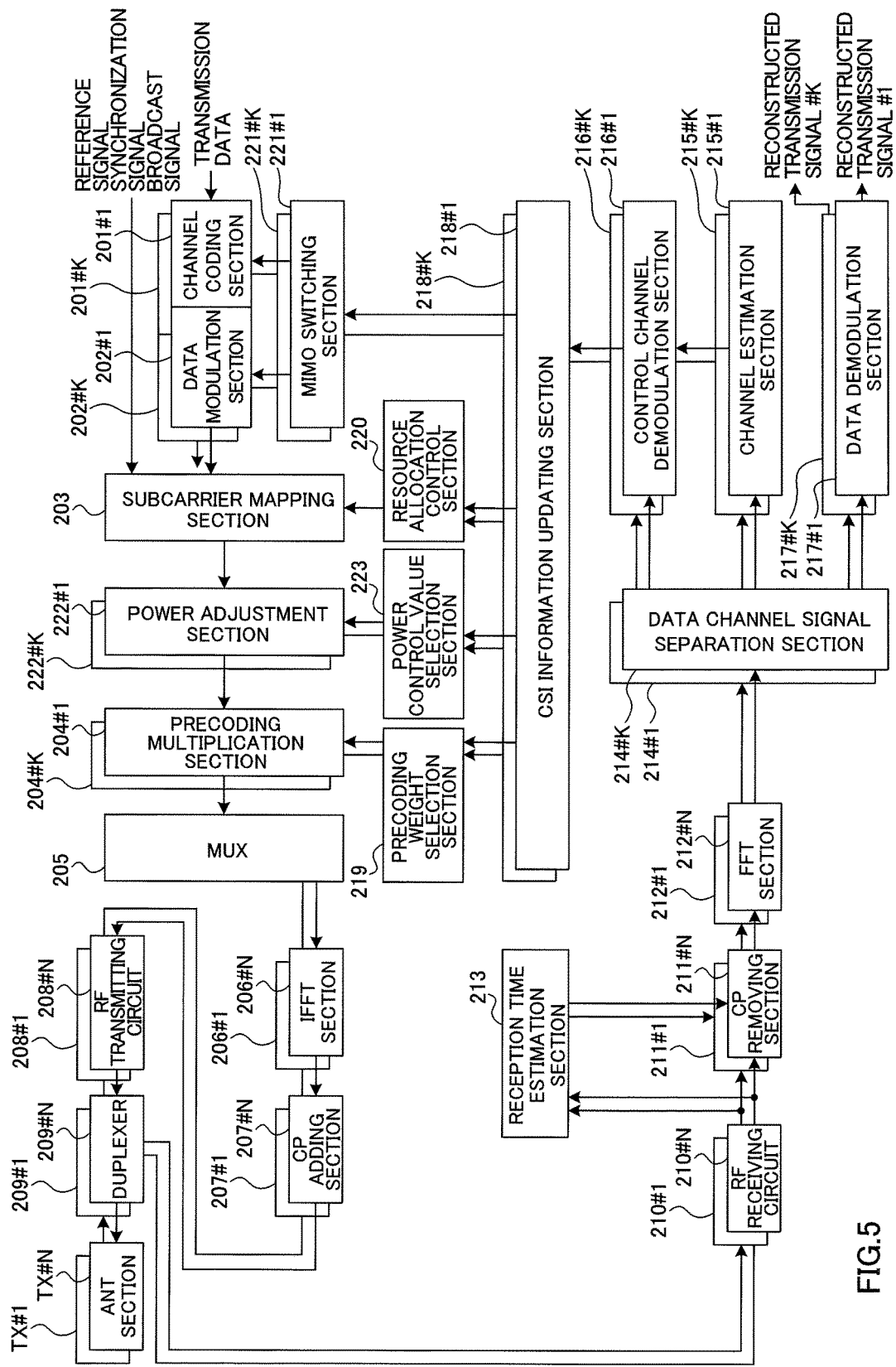
FIG. 5 is a block diagram to show a configuration of a base station apparatus according to the present embodiment.
Figure 6:
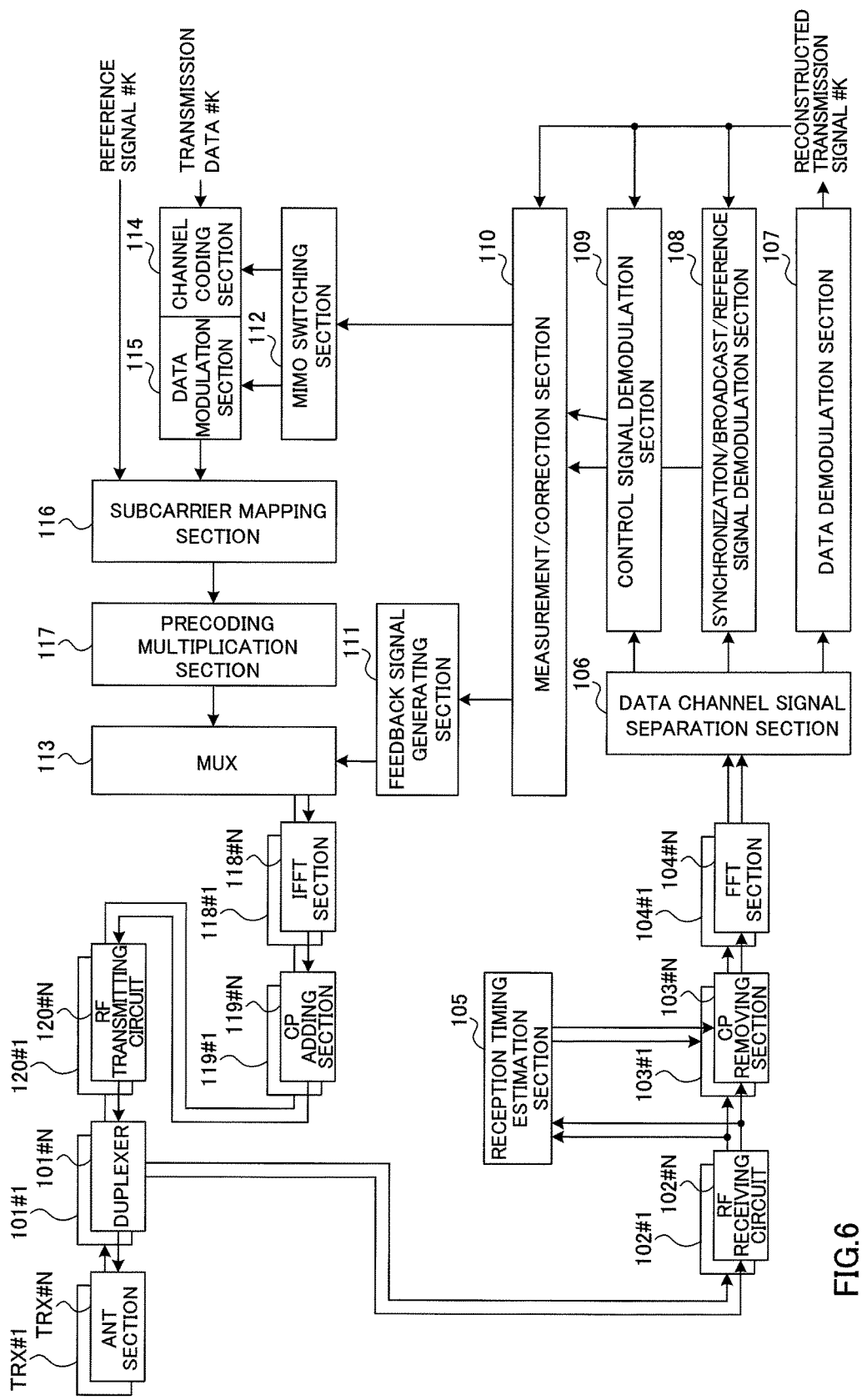
FIG. 6 is a block diagram to show a configuration of a mobile terminal apparatus according to the present embodiment.

FIG. 5 is a block diagram showing a configuration of the base station 200 according to the present embodiment. FIG. 6 is a block diagram showing a configuration of the mobile station 100 according to the present embodiment. Note that, although the configurations of the base station 200 and the mobile station 100 shown in FIG. 5 and FIG. 6 are simplified to explain the present invention, assume that the configurations which a base station apparatus and a mobile station apparatus should normally have are provided.

In the base station 200 shown in FIG. 5, a scheduler, which is not shown, determines the number of users to multiplex (the number of users multiplexed) based on channel estimation values given from channel estimation sections 215 #1 to 215 #K, which will be described later. Then, the content of uplink and downlink resource allocation for each user (scheduling information) is determined, and transmission data #1 to #K for users #1 to #K are transmitted to corresponding channel coding sections 201 #1 to 201 #K.

Transmission data #1 to #K are subjected to channel coding in channel coding sections 201 #1 to 201 #K, and, after that, output to data modulation sections 202 #1 to 202 #K and subjected to data modulation. At this time, the channel coding and data modulation are carried out based on channel coding rates and modulation schemes given from MIMO switching sections 221 #1 to 221 #K, which will be described later. Transmission data #1 to #K, having been subjected to data modulation in data modulation sections 202 #1 to 202 #K, are converted from time sequence signals into frequency domain signals through a discrete Fourier transform in a discrete Fourier transform section, which is not shown, and output to a subcarrier mapping section 203.

The subcarrier mapping section 203 maps transmission data #1 to #K to subcarriers in accordance with resource allocation information that is given from a resource allocation control section 220, which will be described later. At this time, the subcarrier mapping section 203 maps a reference signal input from a reference signal generating section, which is not shown, a synchronization signal input from a synchronization signal generating section, and a broadcast signal input from a broadcast signal generating section, to subcarriers, with transmission data #1 to #K (multiplexing). Transmission data #1 to #K, mapped to subcarriers in this way, are output to power adjustment sections 222 #1 to 222 #K.

Power adjustment sections 222 #1 to 222 #K adjust the transmission power of transmission data #1 to #K, for each of antennas TX #1 to TX #N, based on power control values given from a power control value selection section 223, which will be described later. Transmission data #1 to #K with the transmission power adjusted in power adjustment sections 222 #1 to 222 #K are output to precoding multiplication sections 204 #1 to 204 #K.

Precoding multiplication sections 204 #1 to 204 #K apply a phase and/or amplitude shift to transmission data #1 to #K, for each of antennas TX #1 to TX #N, based on weights given from the precoding weight selection section 219, which will be described later (weighting of antenna TX #1 to antenna TX #N by means of precoding). Transmission data #1 to #K, to which a phase and/or amplitude shift has been applied in precoding multiplication sections 204 #1 to 204 #K, are output to a multiplexer (MUX) 205.

For example, when the above-described first example is applied, power adjustment sections 222 #1 to 222 #K execute transmission power control for downlink measurement object signals using power control values that are specific to each mobile station 100. Also, precoding multiplication sections 204 #1 to 204 #K pre-code the downlink measurement object signals using weights that are specific to each mobile station 100. In particular, precoding multiplication sections 204 #1 to 204 #K can use the weights for transmission data for corresponding mobile stations 100 to pre-code the downlink measurement object signals.

The multiplexer (MUX) 205 combines transmission data #1 to #K, to which a phase and/or amplitude shift has been applied, and generates transmission signals for each of transmitting antennas #1 to TX #N. The transmission signals generated in the multiplexer (MUX) 205 are converted from frequency domain signals to time domain signals through an inverse fast Fourier transform in inverse fast Fourier transform (IFFT) sections 206 #1 to 206 #N. Then, after CPs are added in cyclic prefix (CP) adding sections 207 #1 to 207 #N, the resulting signals are output to RF transmitting circuits 208 #1 to 208 #N. Then, after a frequency conversion process for conversion into a radio frequency band is carried out in RF transmitting circuits 208 #1 to 208 #N, the resulting signals are output to antennas TX #1 to TX #N via duplexers 209 #1 to 209 #N, and transmitted from antennas TX #1 to TX #N to the mobile station 100 on the downlink.

Meanwhile, transmission signals that are output from the mobile station 100 on the uplink are received in antennas TX #1 to TX #N, electrically separated into the transmitting route and the receiving route in duplexers 209 #1 to 209 #N, and, after that, output to RF receiving circuits 210 #1 to 210 #N. Then, in RF receiving circuits 210 #1 to 210 #N, the radio frequency signals are converted to baseband signals through frequency conversion. The baseband signals having been subjected to frequency conversion have the CPs removed in CP removing sections 211 #1 to 211 #N, and then output to fast Fourier transform sections (FFT sections) 212 #1 to 212 #N. A reception time estimation section 213 estimates the times of reception from the reference signals included in the received signals, and reports the estimation result to CP removing sections 211 #1 to 211 #N. FFT sections 212 #1 to 212 #N perform a Fourier transform of the received signals that are input, and convert the signals from time sequence signals to frequency domain signals. These received signals, having been converted into frequency domain signals, are output to data channel signal separation sections 214 #1 to 214 #K.

Data channel signal separation sections 214 #1 to 214 #K separate the received signals input from FFT sections 212 #1 to 212 #N by, for example, the minimum mean squared error (MMSE) and maximum likelihood detection (MLD) signal separation methods. By this means, the received signals that have arrived from the mobile station 100 are divided into received signals pertaining to users #1 to #K. Channel estimation sections 215 #1 to 215 #K estimate channel states from the reference signals included in the received signals separated in data channel signal separation sections 214 #1 to 214 #K, and report the estimated channel states to control channel demodulation sections 216 #1 to 216 #K.

The received signals pertaining to users #1 to #K separated in data channel signal separation sections 214 #1 to 214 #K are demapped and converted back to time sequence signals in a subcarrier demapping section, which is not shown, and then subjected to data demodulation in data demodulation sections 217 #1 to 217 #K. Then, the signals are subjected to channel decoding in channel decoding sections #1 to #K, which are not shown, and, by this means, transmission signals #1 to #K are reconstructed.

Control channel demodulation sections 216 #1 to 216 #K demodulate the control channel signals (for example, the PUCCH) included in the received signals separated in data channel signal separation sections 214 #1 to 214 #K. At this time, in control channel demodulation sections 216 #1 to 216 #K, the control channel signals corresponding to users #1 to #K respectively are demodulated, based on the channel states reported from channel estimation sections 215 #1 to 215 #K. The control channel signals demodulated in control channel demodulation sections 216 #1 to 216 #K are output to CSI information updating sections 218 #1 to 218 #K.

CSI information updating sections 218 #1 to 218 #K extract the channel state information (CSI) included in each control channel signal (for example, the PUCCH) input from control channel demodulation sections 216 #1 to 216 #K, and always keeps the CSI updated in the latest state. For example, the CSI includes PMIs, RIs and CQIs. Also, the CSI that is updated in CSI information updating sections 218 #1 to 218 #K is output to the precoding weight selection section 219, the power control value selection section 223, the resource allocation control section 220 and MIMO switching sections 221 #1 to 221 #K.

The precoding weight selection section 219 selects weights that represent the amounts of phase and/or amplitude shifts to apply to transmission data #1 to #K, based on the CSI input from CSI information updating sections 218 #1 to 218 #K. The selected weights are output to precoding multiplication sections 204 #1 to 204 #K, and used to pre-code transmission data #1 to #K. These precoding weight selection section 219 and precoding multiplication sections 204 #1 to 204 #K constitute a precoding processing section.

For example, when the above-described first example is applied, the precoding weight selection section 219 selects weights by which measurement object signals are multiplied and which are specific to each mobile station 100. In particular, the precoding weight selection section 219 selects the weights used for the transmission data for corresponding mobile stations 100 as the weights to pre-code the downlink measurement object signals with.

The power control value selection section 223 selects the power control values for transmission data #1 to #K based on the CSI input from CSI information updating sections 218 #1 to 218 #K. The selected weights are output to power adjustment sections 222 #1 to 222 #K, and used to control the transmission power of transmission data #1 to #K. Note that these power control value selection section 223 and power adjustment sections 222 #1 to 222 #K constitute a power control section.

For example, when the above-described first example is applied, the power control value selection section 223 selects power control values which are adjusted with respect to the downlink measurement object signals and which are specific to each mobile station 100. In particular, the power control value selection section 223 selects the power control values used for the transmission data for corresponding mobile stations 100 as the power control values to use to control the transmission power of the downlink measurement object signals.

Note that the base station 200 can include the information selected in these precoding weight selection section 219 and power control value selection section 223 in transmission data as higher control information, and transmit this to the mobile stations 100. By this means, weights and power control values that are specific to each mobile station 100 are reported to the corresponding mobile stations 100 by higher layer signaling. A signal to contain these pieces of information may be generated in, for example, a higher control information generating section, which is not illustrated. Note that it is equally possible to include a signal indicating to the effect that precoding/transmission power control using mobile station 100-specific weights/power control values has been applied, in higher control information.

The resource allocation control section 220 determines the resource allocation information to allocate to each mobile station 100 based on the CSI that is input from CSI information updating sections 218 #1 to 218 #K. The resource allocation information that is determined by the resource allocation control section 220 is output to the subcarrier mapping section 203 and used for the mapping of transmission data #1 to transmission data #K.

MIMO switching sections 221 #1 to 221 #K select the MIMO transmission schemes to use for transmission data #1 to #K based on the CSI input from CSI information updating sections 218 #1 to 218 #K. Then, the channel coding rates and modulation schemes (MCS) for transmission data #1 to #K are determined in accordance with the selected MIMO transmission schemes. The determined channel coding rates are output to channel coding sections 201 #1 to 201 #K, and the determined modulation schemes are output to data modulation sections 202 #1 to 202 #K.

For example, when the above-described second and third examples are applied, the base station 200 does not apply precoding or transmission power control to the downlink measurement object signals using mobile station 100-specific weights or power control values. Consequently, without performing the applicable processes, power adjustment sections 222 #1 to 222 #K and precoding multiplication sections 204 #1 to 204 #K output the downlink measurement object signals, input via the subcarrier mapping section 203, to the multiplexer 205.

Also, when the above-described second example is applied, from a mobile station 100, measurement results (for example, CSI) that are corrected based on weights (and power control values) that are specific to that mobile station 100 are fed back. The corrected measurement results are held in, for example, CSI information updating sections 218 #1 to 218 #K. Based on this corrected CSI, MIMO switching sections 221 #1 to 221 #K select the MIMO transmission schemes to use for transmission data #1 to #K, and select MCS in accordance with the selected MIMO transmission schemes.

Meanwhile, when the above-described third example is applied, from a mobile station 100, measurement results (for example, CSI) that are measured from downlink measurement object signals and weights (and power control values) that are specific to the mobile station 100 are fed back from the mobile station 100. The weights (and power control values) specific to the mobile station 100 are held, for example, in CSI information updating sections 218 #1 to 218 #K, with the measurement results. MIMO switching sections 221 #1 to 221 #K correct the measurement results using the weights (and power control values) specific to the mobile station 100, select the MIMO transmission schemes to use for transmission data #1 to #K, and furthermore select MCS in accordance with the selected MIMO transmission schemes.

Meanwhile, in the mobile station 100 shown in FIG. 6, transmission signals that are output from the base station 200 are received in transmitting/receiving antennas TRX #1 to TRX #N, and after having been electrically separated into the transmitting route and the receiving route in duplexers 101 #1 to 101 #N, output to RF receiving circuits 102 #1 to 102 #N. Then, in RF receiving circuits 102 #1 to 102 #N, the signals are converted from radio frequency signals to baseband signals through frequency conversion. The baseband signals have the CPs removed in cyclic prefix (CP) removing sections 103 #1 to 103 #N, and, after that, output to fast Fourier transform sections (FFT sections) 104 #1 to 104 #N. The reception time estimation section 105 estimates the times of reception from the reference signals included in the received signals, and reports the estimation result to CP removing sections 103 #1 to 103 #N. FFT sections 104 #1 to 104 #N convert the received signals that are input, from time sequence signals to frequency domain signals by performing a Fourier transform. The received signals, having been converted into frequency domain signals, are output to the data channel signal separation section 106.

The data channel signal separation section 106 separates the received signals input from FFT sections 104 #1 to 104 #N by, for example, the minimum mean squared error (MMSE) and maximum likelihood detection (MLD) signal separation methods. By this means, the received signals having arrived from the base station 200 are separated into received signals pertaining to users #1 to #K, and the received signal pertaining to the user of the mobile station 100 (here, user #K) is extracted. The received signal pertaining to user #K, separated in the data channel signal separation section 106, is demapped and converted back to a time sequence signal in a subcarrier demapping section, which is not shown, and then demodulated in the data demodulation section 107. Then, this signal is subjected to channel decoding in a channel decoding section, which is not shown, and, by this means, transmission signal #K is reconstructed.

The synchronization/broadcast/reference signal demodulation section 108 demodulates the synchronization signal, broadcast signal and reference signal included in the received signal separated in the data channel signal separation section 106. Meanwhile, the control signal demodulation section 109 demodulates the control signals (for example, the PDCCH) included in the received signal separated in the data channel signal separation section 106. At this time, in the control signal demodulation section 109, the control signals pertaining to user #K are demodulated based on the channel state reported from a channel estimation section, which is not illustrated. The synchronization signal, broadcast signal and reference signal demodulated in the synchronization/broadcast/reference signal demodulation section 108, and each control signal demodulated in the control signal demodulation section 109, are output to a measurement/correction section 110.

For example, when the above-described first example is applied, based on specific signals (for example, DM-RSs) that are pre-coded (or applied transmission power control) based on weights (power control values) that are specific to the mobile station 100, the synchronization/broadcast/reference signal demodulation section 108 acquires weights (power control values) that are specific to the mobile station 100. Then, using the acquired weights, the synchronization signal, broadcast signal and reference signal are demodulated. Note that the acquired weights and power control values are output to the measurement/correction section 110.

Note that, when mobile station 100-specific weights are reported from the base station 200 by way of higher layer signaling, in the data signals demodulated in the data demodulating section 107, the weights that are reported by a higher layer signaling signal are output to the synchronization/broadcast/reference signal demodulation section 108. The synchronization/broadcast/reference signal demodulation section 108 demodulates the synchronization signal, broadcast signal and reference signal using these weights.

The measurement/correction section 110 performs measurement processes with the synchronization signal, broadcast signal and reference signal input from the synchronization/broadcast/reference signal demodulation section 108, or the control signals input from the control signal demodulation section 109. For example, the measurement/correction section 110 establishes synchronization with the base station 200 by performing a measurement process based on the synchronization signal from the synchronization/broadcast/reference signal demodulation section 108. Also, the measurement/correction section 110 measures the received power (for example, RSRP: Reference Signal Received Power) from the base station 200 by performing a measurement process based on the broadcast signal from the synchronization/broadcast/reference signal demodulation section 108. Furthermore, the measurement/correction section 110 measures channel quality (CQI) by performing a measurement process based on the reference signal from the synchronization/broadcast/reference signal demodulation section 108. The measurement/correction section 110 selects a PMI and an RI based on the measured CQI. Then, CSI (CQI, PMI and RI) or RSRP is reported to the feedback signal generating section 111 and the MIMO switching section 112.

For example, when the above-described first example is applied, the measurement/correction section 110 can perform the measurement processes based on downlink measurement object signals that are demodulated using weights that are specific to the mobile station 100. Also, when transmission power control is applied to the downlink measurement object signals, the measurement/correction section 110 can adjust the downlink measurement object signals based on power control values input from the synchronization/broadcast/reference signal demodulation section 108.

Note that, when mobile station 100-specific power control values are reported from the base station 200 by way of higher layer signaling, in the data signals demodulated in the data demodulating section 107, the power control values that are reported by a higher layer signaling signal are output to the measurement/correction section 110. The measurement/correction section 110 can adjust the downlink measurement object signals based on these power control values.

Also, when the above-described second example is applied, the downlink measurement object signals are not pre-coded using mobile station 100-specific weights. Consequently, the synchronization/broadcast/reference signal demodulation section 108 outputs the synchronization signal, broadcast signal and reference signal to the measurement/correction section 110 without demodulating them. The measurement/correction section 110 performs measurement processes with these synchronization signal, broadcast signal and reference signal. Meanwhile, the measurement/correction section 110 corrects the measurement results using weights/power control values that are input from the synchronization/broadcast/reference signal demodulation section 108.

The feedback signal generating section 111 generates a feedback signal to feed back to the base station 200. In this case, the feedback signal includes the CQI, PMI, RI and RSRP reported from the measurement/correction section 110. The feedback signal (CSI feedback, RSRP feedback) generated in the feedback signal generating section 111 is output to a multiplexer (MUX) 113.

For example, when the above-described second example is applied, the feedback signal generating section 111 generates a feedback signal including measurement results (for example, CQIs) that are corrected using weights that are specific to the mobile station 100. Also, when the above-described third example is applied, the feedback signal generating section 111 generates a feedback signal including measurement results that are measured from the downlink measurement object signals, and weights (power control values) that are derived from signals (for example, DM-RSs) pre-coded (or applied transmission power control) based on weights (power control values) that are specific to the mobile station 100.

The MIMO switching section 112 selects the MIMO transmission scheme to use for transmission data #K based on the CQI, PMI and RI input from the measurement/correction section 110. Then, the channel coding rate and modulation scheme for transmission data #K are determined in accordance with the selected MIMO transmission scheme. The determined channel coding rate is output to the channel coding section 114, and the determined modulation scheme is output to the data modulation section 115.

Transmission data #K, related to user #K and transmitted from a higher layer, is subjected to channel coding in the channel coding section 114, and then subjected to data modulation in the data modulation section 115. Transmission data #K having been subjected to data modulation in the data modulation section 115 is converted from a time sequence signal to a frequency domain signal in a serial-to-parallel conversion section, which is not shown, and output to the subcarrier mapping section 116.

In the subcarrier mapping section 116, transmission data #K is mapped to subcarriers in accordance with scheduling information that is designated from the base station 200. At this time, the subcarrier mapping section 116 maps (multiplexes) reference signal #K, generated in a reference signal generating section, which is not shown, to subcarriers, with transmission data #K. Transmission data #K mapped to subcarriers in this way is output to a precoding multiplication section 117.

The precoding multiplication section 117 applies a phase and/or amplitude shift to transmission data #K, for each of transmitting/receiving antennas TRX #1 to TRX #N. At this time, the precoding multiplication section 117 applies the phase and/or amplitude shifts in accordance with weights that correspond to PMIs designated by the control signals demodulated in the control signal demodulation section 109. Transmission data #K, having been subjected to a phase and/or amplitude shift by the precoding multiplication section 117, is output to the multiplexer (MUX) 113.

The multiplexer (MUX) 113 combines transmission data #K, to which a phase and/or amplitude shift has been applied, and the control signals generated in the feedback signal generating section 111, and generates transmission signals for each of transmitting/receiving antennas TRX #1 to TRX #N. The transmission signals generated in the multiplexer (MUX) 113 are converted from frequency domain signals to time domain signals in inverse fast Fourier transform sections (IFFT sections) 118 #1 to 118 #N through an inverse fast Fourier transform, and, after that, have CPs added thereto in CP adding sections 119 #1 to 119 #N, and output to RF transmitting circuits 120 #1 to 120 #N. Then, after a frequency conversion process for conversion into a radio frequency band is performed in RF transmitting circuits 120 #1 to 120 #N, the signals are output to transmitting/receiving antennas TRX #1 to TRX #N via duplexers 101 #1 to 101 #N, and transmitted from transmitting/receiving antennas TRX #1 to TRX #N to the base station 200 on the uplink.

The present invention is by no means limited to the above embodiment and can be implemented in various modifications. For example, it is possible to adequately change the number of carriers, the bandwidth of carriers, the signaling method, the number of processing sections, the order of processes and so on in the above description, without departing from the scope of the present invention, and implement the present invention. Besides, the present invention can be implemented with various changes, without departing from the scope of the present invention.

The disclosure of Japanese Patent Application No. 2012-170260, filed on Jul. 31, 2012, including the specification, drawings and abstract, is incorporated herein by reference in its entirety.

The invention claimed is:

1. A base station apparatus comprising:
a precoding processing section configured to pre-code a channel state information reference signal using a precoding weight that is specific to a user terminal; and
a transmission section configured to transmit the channel state information reference signal having been pre-coded in the precoding processing section, to the user terminal,
wherein the transmission section provides the user terminal with information about the precoding weight that is specific to the user terminal.

2. The base station apparatus according to claim 1, wherein the precoding processing section pre-codes the channel state information reference signal using a precoding weight that is used to pre-code a downlink shared data channel signal for the user terminal.

3. The base station apparatus according to claim 1, further comprising a power control section configured to execute power control for the channel state information reference signal using a power control value that is specific to the user terminal,
wherein the transmission section transmits the channel state information reference signal having been pre-coded in the precoding processing section and subjected to the power control in the power control section, to the user terminal.

4. The base station apparatus according to claim 1, wherein the information about the precoding weight that is specific to the user terminal is included in control information to be provided to the user terminal.

5. The base station apparatus according to claim 3, wherein the power control value that is specific to the user terminal is reported to the user terminal.

6. A user terminal comprising:
a receiving section configured to receive a channel state information reference signal that is pre-coded using a precoding weight that is specific to the user terminal;
a demodulation section configured to demodulate the channel state information reference signal using the precoding weight; and
a measurement section configured to perform a measurement process based on the demodulated channel state information reference signal,
wherein the receiving section receives information about the precoding weight provided from a base station apparatus, and
the demodulation section demodulates the channel state information reference signal using the information about the precoding weight.

7. The user terminal according to claim 6, wherein the receiving section receives the information about the precoding weight in control information or DM-RS (DeModulation-Reference Signal).

8. The user terminal according to claim 6, wherein the measurement section performs the measurement process based on the channel state information reference signal having been adjusted based on a power control value that is specific to the user terminal.

9. The user terminal according to claim 8, wherein the measurement section adjusts the channel state information reference signal using the power control value that is reported from the base station apparatus.

10. A user terminal comprising:
a receiving section configured to receive a channel state information reference signal, and a specific signal that is pre-coded using a precoding weight that is specific to the user terminal, from a base station apparatus;

a demodulation section configured to demodulate the channel state information reference signal;

a measurement section configured to perform a measurement process based on the channel state information reference signal; and a correction section configured to correct a measurement result in the measurement section using the precoding weight that is used to pre-code the specific signal, wherein the receiving section receives information about the precoding weight provided from the base station apparatus.

11. The user terminal according to claim 10, wherein:

the receiving section receives the specific signal having been subjected to power control using a power control value that is specific to the user terminal; and the correction section corrects the measurement result in the measurement section using the power control value that is used in the power control of the specific signal.

12. A user terminal comprising:

a receiving section configured to receive a channel state information reference signal, and a specific signal that is pre-coded using a precoding weight that is specific to the user terminal, from a base station apparatus;

a demodulation section configured to demodulate the channel state information reference signal;

a measurement section configured to perform a measurement process based on the demodulated channel state information reference signal; and a transmission section configured to transmit a measurement result in the measurement section and the precoding weight that is used to pre-code the specific signal, to the base station apparatus, wherein the receiving section receives information about the precoding weight provided from the base station apparatus.

13. The user terminal according to claim 12, wherein:

the receiving section receives the specific signal, having been subjected to power control using a power control value that is specific to the user terminal; and the transmission section transmits the power control value that is used in the power control of the specific signal, to the base station apparatus.

14. A communication system comprising:

a base station apparatus comprising:

a precoding processing section configured to pre-code a channel state information reference signal using a precoding weight that is specific to a user terminal; and a transmission section configured to transmit the channel state information reference signal having been pre-coded in the precoding processing section, to the user terminal; and the user terminal comprising:

a receiving section configured to receive the channel state information reference signal having been pre-coded using the precoding weight;

a demodulation section configured to demodulate the channel state information reference signal using the precoding weight; and a measurement section configured to perform a measurement process based on the demodulated channel state information reference signal, wherein the receiving section receives information about the precoding weight provided from the base station apparatus, and the demodulation section demodulates the channel state information reference signal using the information about the precoding weight.

15. A communication control method comprising the steps of:

in a base station apparatus:

pre-coding a channel state information reference signal using a precoding weight that is specific to a user terminal; and transmitting the pre-coded channel state information reference signal to the user terminal; and in the user terminal:

receiving the channel state information reference signal having been pre-coded using the precoding weight;

demodulating the channel state information reference signal using the precoding weight; and performing a measurement process based on the demodulated channel state information reference signal, wherein the user terminal demodulates the channel state information reference signal using information about the precoding weight provided from the base station apparatus.

16. The base station apparatus according to claim 1, wherein the transmission section provides the user terminal with the information about the precoding weight that is specific to the user terminal by a downlink control channel and/or higher layer signaling.

17. The base station apparatus according to claim 1, wherein when pre-coding the channel state information reference signal using the precoding weight that is specific to the user terminal, the transmission section notifies the user terminal of execution of pre-coding by at least one of a downlink control channel, a broadcast signal and higher layer signaling.

* * * * *